United States Patent
Yoon et al.

(10) Patent No.: US 11,264,661 B2
(45) Date of Patent: Mar. 1, 2022

(54) BATTERY CELL WITH IMPROVED SAFETY

(71) Applicant: LG Energy Solution, Ltd., Seoul (KR)

(72) Inventors: Ji-Su Yoon, Daejeon (KR); Dal-Mo Kang, Daejeon (KR); Su-Chang Kim, Daejeon (KR); Jeong-O Mun, Daejeon (KR); Jae-Uk Ryu, Daejeon (KR)

(73) Assignee: LG Energy Solution, Ltd.

( * ) Notice: Subject to any disclaimer, the term of this patent is extended or adjusted under 35 U.S.C. 154(b) by 191 days.

(21) Appl. No.: 16/348,361

(22) PCT Filed: Jan. 3, 2018

(86) PCT No.: PCT/KR2018/000137
§ 371 (c)(1),
(2) Date: May 8, 2019

(87) PCT Pub. No.: WO2018/199425
PCT Pub. Date: Nov. 1, 2018

(65) Prior Publication Data
US 2020/0227690 A1    Jul. 16, 2020

(30) Foreign Application Priority Data

Apr. 25, 2017    (KR) .......................... 10-2017-0052904

(51) Int. Cl.
*H01M 50/116*    (2021.01)
*A62C 3/16*    (2006.01)
(Continued)

(52) U.S. Cl.
CPC .............. *H01M 50/116* (2021.01); *A62C 3/16* (2013.01); *H01M 50/172* (2021.01); *H01M 50/531* (2021.01); *H01M 2200/10* (2013.01)

(58) Field of Classification Search
CPC ............ H01M 50/116; H01M 50/531; H01M 50/172; A62C 3/16
See application file for complete search history.

(56) References Cited

U.S. PATENT DOCUMENTS

| | | |
|---|---|---|
| 2007/0164711 A1 | 7/2007 | Kim et al. |
| 2007/0231679 A1 | 10/2007 | Chang et al. |

(Continued)

FOREIGN PATENT DOCUMENTS

| | | |
|---|---|---|
| CN | 202025698 U | 11/2011 |
| CN | 102763182 A | 10/2012 |

(Continued)

OTHER PUBLICATIONS

Extended European Search Report including the Written Opinion for Application No. EP 18790382.8 dated Feb. 7, 2020, 8 pages.

(Continued)

*Primary Examiner* — Helen Oi K Conley
(74) *Attorney, Agent, or Firm* — Lerner, David, Littenberg, Krumholz & Mentlik, LLP

(57) ABSTRACT

Disclosed is a battery cell, which includes: an electrode assembly; an electrode lead connected to the electrode assembly; a pouch case surrounding the electrode assembly and sealed in a state in which the electrode lead extends through the pouch case and is exposed at an outside surface of the pouch case; and a fire extinguishing unit disposed in the pouch case and configured to eject a fire extinguishing powder when a temperature of the first extinguishing unit is equal to or greater than a predetermined limit temperature.

4 Claims, 3 Drawing Sheets

(51) Int. Cl.
   *H01M 50/172*   (2021.01)
   *H01M 50/531*   (2021.01)

(56) References Cited

U.S. PATENT DOCUMENTS

| | | |
|---|---|---|
| 2011/0149477 A1 | 6/2011 | Summey et al. |
| 2012/0196173 A1 | 8/2012 | Kim |
| 2013/0143109 A1 | 6/2013 | Kim et al. |

FOREIGN PATENT DOCUMENTS

| | | |
|---|---|---|
| CN | 103119754 A | 5/2013 |
| CN | 104064692 A | 9/2014 |
| CN | 104218194 A | 12/2014 |
| DE | 102012208314 A1 | 11/2013 |
| JP | 2009099322 A | 5/2009 |
| JP | 2009218078 A | 9/2009 |
| JP | 2013012448 A | 1/2013 |
| JP | 5449695 B2 | 3/2014 |
| JP | 2014144033 A | 8/2014 |
| JP | 2015162285 A | 9/2015 |
| KR | 20040105338 A | 12/2004 |
| KR | 100509747 B1 | 8/2005 |
| KR | 20070071237 A | 7/2007 |
| KR | 20070071250 A | 7/2007 |
| KR | 20070073173 A | 7/2007 |
| KR | 100988710 B1 | 10/2010 |
| KR | 101066021 B1 | 9/2011 |
| KR | 20170019020 A | 2/2017 |

OTHER PUBLICATIONS

International Search Report for PCT/KR2018/000137, dated Jun. 26, 2018.
Chinese Search Report for Application No. 201880004915.6 dated Jul. 6, 2021, 3 Pages.

BATTERY CELL WITH IMPROVED SAFETY

CROSS-REFERENCE TO RELATED APPLICATIONS

This application is a national phase entry under 35 U.S.C. § 371 of International Patent Application No. PCT/KR2018/000137, filed on Jan. 3, 2018, published in Korean, which claims priority from Korean Patent Application No. 10-2017-0052904, filed on Apr. 25, 2017, the disclosures of which are hereby incorporated herein by reference.

TECHNICAL FIELD

The present disclosure relates to a battery cell with improved safety, and more particularly, to a battery cell with improved safety against ignition and explosion by inserting a fire extinguishing device containing a fire extinguishing agent therein.

BACKGROUND ART

As portable electric products such as video cameras, cellular phones and portable PCs are used more broadly, the importance of secondary batteries mainly used as a driving power source therefor is increasing.

A secondary battery capable of charging and discharging, different from a primary battery cannot be recharged is being actively studied in high-tech fields such as digital cameras, cellular phones, laptop computers, power tools, electric bicycles, electric vehicles, hybrid electric vehicles and mass-capacity power storage devices.

In particular, a lithium secondary battery has a high energy density per unit weight and allows rapid charging, compared to other secondary batteries such as lead storage batteries, nickel-cadmium batteries, nickel-hydrogen batteries and nickel-zinc batteries, and thus it is used more and more.

The lithium secondary battery has an operating voltage of 3.6V or above. The lithium secondary battery is used as a power source for a portable electronic device, or a plurality of lithium secondary batteries are connected in series or in parallel and used for a high output electric vehicle, a hybrid electric vehicle, a power tool, an electric bicycle, a power storage device or a UPS.

The lithium secondary battery has an operating voltage three times higher than that of a nickel-cadmium battery or a nickel-metal hydride battery and has a high energy density per unit weight. For this reason, the lithium secondary battery tends to be used more and more.

The lithium secondary battery may be classified into a lithium ion battery using a liquid electrolyte and a lithium ion polymer battery using a polymer solid electrolyte depending on an electrolyte type. In addition, the lithium ion polymer battery may be classified into a pure solid lithium ion polymer battery without containing any electrolyte and a lithium ion polymer battery using a gel polymer electrolyte containing an electrolytic solution, depending on a polymer solid electrolyte type.

In the lithium ion battery using a liquid electrolyte, a cylindrical or rectangular metal can is generally used as a container in a welded and sealed form. Since the can-type secondary battery using the metal can as a container has a fixed shape, there is a disadvantage that it restricts the design of an electric product using the can-type secondary battery as a power source, and it is difficult to reduce the volume. Thus, a pouch-type secondary battery prepared by putting an electrode assembly and an electrolyte in a pouch packaging material made of a film and sealing the pouch packaging material has been developed and used.

However, the lithium secondary battery has a risk of explosion when being overheated and thus it is important to secure safety. The lithium secondary battery is overheated due to various factors, one of which is an overcurrent flow above a limit through the lithium secondary battery. If the overcurrent flows, the lithium secondary battery is heated by the Joule heat, so the internal temperature of the battery rises rapidly. In addition, the rapid rise in temperature causes a decomposition reaction of the electrolyte, causing a thermal runaway, which eventually leads to the explosion of the battery. Overcurrent occurs in the case where a sharp metal object penetrates the lithium secondary battery, where the insulation between positive and negative electrodes is destroyed due to the shrinkage of a separator interposed between the positive and negative electrodes, where a rush current is applied to the battery due to abnormality of a charging circuit or a load connected to the outside, or the like.

Thus, the lithium secondary battery is used in combination with a protecting circuit in order to protect the battery against an abnormal situation such as overcurrent, and the protecting circuit generally includes a fuse element for irreversibly disconnecting a line through which a charging or discharging current flows when overcurrent occurs.

FIG. 1 is a circuit diagram for illustrating an arrangement and an operating mechanism of a fuse element provided in a protecting circuit coupled to a battery pack including a lithium secondary battery.

As shown in FIG. 1, in order to protect the battery pack when overcurrent occurs, the protecting circuit includes a fuse element 1, a sensing resistor 2 for sensing overcurrent, a microcontroller 3 for monitoring the occurrence of overcurrent and operating the fuse element 1 when overcurrent occurs, and a switch 4 for switching the inflow of an operating current to the fuse element 1.

The fuse element 1 is installed on a main line connected to an outermost terminal of the battery pack. The main line refers to a wiring through which a charging current or a discharging current flows. In FIG. 1, it is depicted that the fuse element 1 is installed at a high-potential line (Pack+).

The fuse element 1 is a three-terminal element, where two terminals are connected to the main line through which a charging or discharging current flows and one terminal is connected to the switch 4. In addition, the fuse element 1 includes a fuse 1a connected to the main line in series and melted and cut at a certain temperature and a resistor 1b for applying heat to the fuse 1a.

The microcontroller 3 periodically detects the voltage at both ends of the sensing resistor 2 and monitors whether overcurrent occurs. If it is determined that overcurrent occurs, the microcontroller 3 turns on the switch 4. If so, the current flowing on the main line is bypassed to the fuse element 1 and applied to the resistor 1b. Accordingly, the Joule heat generated at the resistor 1b is conducted to the fuse 1a to raise the temperature of the fuse 1a. If the temperature of the fuse 1a rises to the melting temperature, the fuse 1a is melted and cut so that the main line is irreversibly disconnected. If the main line is disconnected, the overcurrent does not flow any more, thereby overcoming the problem caused by the overcurrent.

However, the above conventional technique has several problems. In other words, if the microcontroller 3 is broken, the switch 4 does not turn on even though overcurrent occurs. In this case, a current does not flow into the resistor 1b of the fuse element 1, and thus the fuse element 1 does not operate. Also, a space for disposing the fuse element 1 is separately required inside the protecting circuit, and a program algorithm for controlling the operation of the fuse element 1 must be loaded in the microcontroller 3. Thus, it is disadvantageous that the space efficiency of the protecting circuit is deteriorated and the load of the microcontroller 3 is increased.

DISCLOSURE

Technical Problem

The present disclosure is designed to solve the problems of the related art, and therefore the present disclosure is directed to providing a battery cell configured to greatly improve the safety of a secondary battery in use by preventing the occurrence of an event such as ignition and explosion without deteriorating the energy density of the battery cell.

However, the technical problem to be solved by the present disclosure is not limited to the above, and other objects not mentioned herein will be understood from the following description by those skilled in the art.

Technical Solution

In one aspect of the present disclosure, there is provided a battery cell, comprising: an electrode assembly; an electrode lead connected to the electrode assembly; a pouch case surrounding the electrode assembly and sealed in a state in which the electrode lead extends through the pouch case and is exposed at an outside surface of the pouch case; and a fire extinguishing unit disposed in the pouch case and configured to eject a fire extinguishing agent when a temperature of the first extinguishing unit is equal to or greater than a predetermined limit temperature.

The electrode lead may be bonded to an electrode tab connected to the electrode assembly and the electrode lead.

The fire extinguishing unit may include: the fire extinguishing agent; and an accommodation container surrounding the fire extinguishing agent and made of a synthetic resin that is configured to be melted when the temperature of the fire extinguishing unit is equal to or greater than the predetermined limit temperature to open the powder container.

The fire extinguishing unit may be disposed in a region containing a bonding portion at which the electrode tab and the electrode lead are bonded to one another.

The fire extinguishing unit may be attached onto the bonding portion by a thermally conductive adhesive.

The fire extinguishing unit may be attached to an inner surface of the pouch case.

The fire extinguishing unit may extend along a width direction of the battery cell, and the fire extinguishing unit may be attached to a bonding portion at which the electrode tab and the electrode lead are bonded to one another, and the fire extinguishing unit may have a shape that is bent around surfaces of the electrode tab and the electrode lead at the bonding portion.

Advantageous Effects

According to an embodiment of the present disclosure, it is possible to ensure the safety of a secondary battery in use by greatly lowering the possibility of occurrence of an event such as ignition and explosion of a battery cell without deteriorating the energy density of the battery cell.

In particular, according to an embodiment of the present disclosure, it is possible to prevent ignition inside the battery cell, and even though a fire breaks out therein, it is possible to rapidly extinguish the fire and fundamentally block the current supplied to the outside through the battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a battery cell according to an embodiment of the present disclosure will be described with reference to FIGS. 2 to 4.

Figure 1:
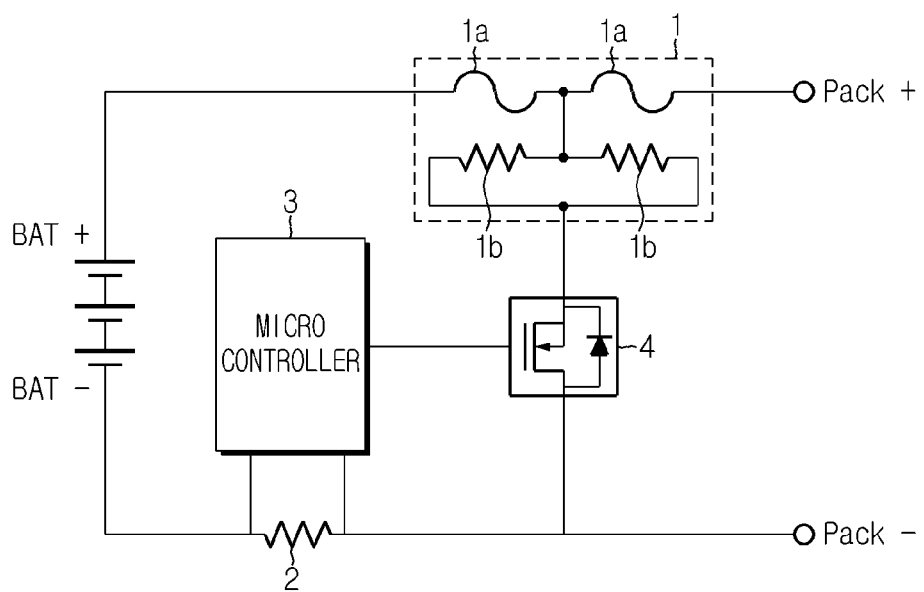
FIG. 1 is a circuit diagram for illustrating an arrangement and an operating mechanism of a fuse element provided in a protecting circuit coupled to a battery module.
Figure 2:
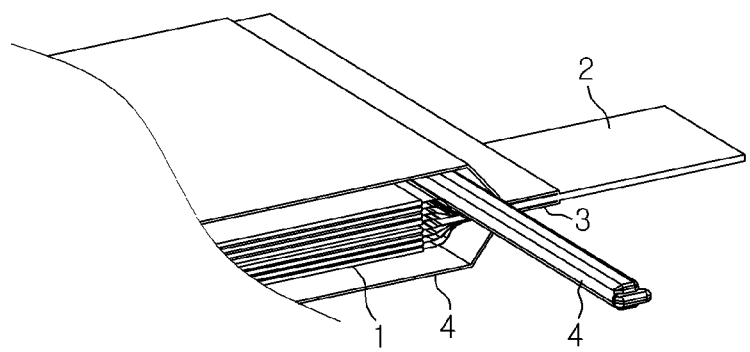
FIGS. 2 to 4 are cross-sectioned views showing an inner structure of a battery cell according to an embodiment of the present disclosure.
Figure 3:
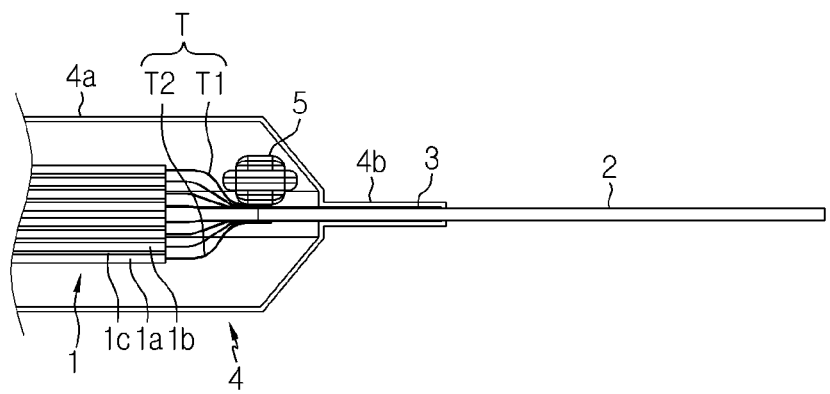
Figure 4:
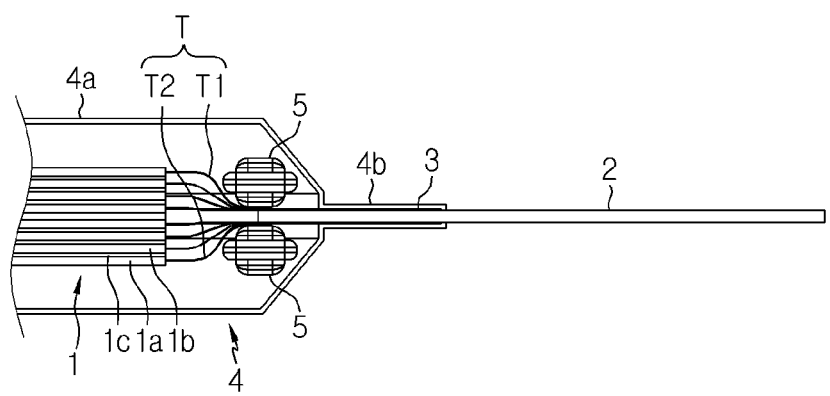

FIGS. 2 to 4 are cross-sectioned views showing an inner structure of a battery cell according to an embodiment of the present disclosure.

First, referring to FIGS. 2 and 3, a battery cell according to an embodiment of the present disclosure is implemented to include an electrode assembly 1, an electrode lead 2, a sealant 3, a pouch case 4 and a fire extinguishing unit 5.

The electrode assembly 1 is configured so that a separator 1c is interposed between a positive electrode plate 1a and a negative electrode plate 1b, which are alternately stacked, and the separator 1c may be respectively located at both outermost sides of the electrode assembly 1 for insulation.

The positive electrode plate 1a includes a positive electrode current collector and a positive electrode active material layer coated on at least one surface thereof. An uncoated positive electrode region not coated with the positive electrode active material layer is formed at one end thereof, and the uncoated positive electrode region functions as an electrode tab T connected to the electrode lead 2.

Similarly, the negative electrode plate 1b includes a negative electrode current collector and a negative electrode active material layer coated on at least one surface thereof. An uncoated region not coated with the negative electrode active material layer is formed at one side thereof, and the uncoated region functions as an electrode tab T connected to the electrode lead 2.

Meanwhile, the positive electrode plate 1a and the negative electrode plate 1b may be arranged so that the electrode tabs T having different polarities, namely a positive electrode tab and a negative electrode tab, are oriented in the same direction or oriented in opposite directions, when being stacked.

When the positive electrode tab and the negative electrode tab are disposed to be oriented opposite to each other, the battery cell is manufactured so that the pair of electrode leads 2 are also located opposite to each other. Also, if the positive electrode tab and the negative electrode tab are disposed to be oriented in the same direction, the battery cell is manufactured so that the pair of electrode leads 2 are located in the same direction.

In addition, the separator 1c is disposed between the positive electrode plate 1a and the negative electrode plate 1b to prevent direct contact between the electrode plates having different polarities. Also, the separator 1c may be made of a porous material to enable ions to transfer between the positive electrode plate 1a and the negative electrode plate 1b by using the electrolyte as a medium.

The electrode lead 2 is classified into a positive electrode lead connected to the positive electrode tab and a negative electrode lead connected to the negative electrode tab. If the positive electrode tab and the negative electrode tab are disposed to be oriented in the same direction as described above, the pair of electrode leads 2 are also drawn in the same direction. Also, if the positive electrode tab and the negative electrode tab are disposed to be oriented in different directions, the pair of electrode leads 2 are also drawn in different directions.

Meanwhile, the plurality of electrode tabs T may be connected to any one of the upper surface and the lower surface of the electrode leads 2. However, as shown in the figure, the electrode tabs T1 located at the upper portion based on the electrode leads 2 may be attached to the upper surface of the electrode lead 2, and the electrode tabs T2 located at the lower portion may be attached to the lower surface of the electrode leads 2.

If the electrode tabs T are classified into two groups and attached to different positions of the electrode leads 2 as described above, it is possible to minimize the deflection of the electrode tabs T. In addition, the current flow transferred toward the electrode leads 2 through the electrode tabs T may be distributed to prevent the amount of heat locally generated from increasing excessively, and also it is possible to maximize the contact area between the electrode tabs T and the electrode leads 2, thereby minimizing the resistance at the contact surface.

The electrode lead 2 is generally made of a nickel-coated aluminum material. Due to this material problem, the electrode lead 2 is not well adhered to the inner surface of the pouch case 4 when the pouch case 4 is sealed.

Thus, the area where the electrode lead 2 is drawn out in the sealing region of the pouch case 4 may have weak sealing, and thus a sealant 3 made of a resin material having good adhesion to the inner surface of the pouch case 4 may be attached to the periphery of the electrode lead 2 in order to improve the sealing property.

The pouch case 4 may be composed of an upper case covering an upper portion of the electrode assembly 1 and a lower case covering a lower portion thereof, and the upper case and the lower case may be respectively composed of a multi-layered pouch film including a first resin layer, a metal layer and a second resin layer.

In this case, the first resin layer forming the innermost surface of the pouch film may be made of a resin with a thermal fusion property so that the upper and lower cases may be fused to each other when heat is applied thereto in a state where the upper and lower cases are in contact with each other.

The pouch case 4 may be classified into two portions, namely an accommodation portion 4a that accommodates the electrode assembly 1 and a sealing portion 4b that seals the pouch case 4 at which the electrode lead 2 is thermally bonded in a state of being drawn to the outside in the circumferential direction of the accommodation portion.

As described above, since the region of the sealing portion 4b where the electrode lead 2 passes may have weak sealing property, the sealant 3 is applied to the corresponding region.

In other words, the sealant 3 is interposed between the inner surfaces of the upper pouch case and the lower pouch case in a state of being attached to the periphery of the electrode lead 2.

The fire extinguishing unit 5 is disposed in the pouch case and ejects the fire extinguishing powder at a reference temperature or above to prevent ignition inside the battery cell and/or to terminate the ignition event occurring in the battery cell.

In order to perform the above function, the fire extinguishing unit 5 includes an accommodation container made of a resin that maintains a sealed state at a normal operating temperature of the battery cell and is melted and opened at the reference temperature or above, and a fire extinguishing agent accommodated therein.

The fire extinguishing agent may be selected from a variety of fire extinguishing agents commonly used for fire extinguishing, irrespective of whether it is powder, liquid or gas, without limitation in its detail ingredients. The fire extinguishing principle is also capable of adopting extinguishment by smothering, cooling fire extinguishment, or both of them.

If the temperature inside the battery cell becomes higher than the reference temperature and thus the accommodation container is melted and broken, the fire extinguishing agent therein is ejected by the strong pressure and spread to the entire of the battery cell as a whole, thereby preventing ignition inside the battery cell. The accommodation container may be filled with the gas at high pressure in addition to the fire extinguishing agent so that the fire extinguishing agent may be ejected out of the broken accommodation container by strong pressure at a certain temperature or above. In this case, the gas expanded according to the temperature rise applies a high pressure to the inner wall of the accommodation container. If the temperature reaches a melting point of the accommodation container, the melted and weakened accommodation container is broken and the fire extinguishing agent may be ejected together with the gas filled in the accommodation container.

Meanwhile, the fire extinguishing unit 5 may not only extinguish or prevent the already generated fire by means of the extinguishing action of the fire extinguishing agent but also fundamentally block a subsequent event by disconnecting the connection between the electrode tab T and the electrode lead 2 with the pressure when the fire extinguishing agent is ejected, to intercept the current flow through the electrode lead 2.

In order to perform this function, the fire extinguishing unit 5 applied to the present disclosure may be disposed in a region corresponding to the bonding portion of the electrode tab T and electrode lead 2.

In this case, as described above, by cutting the connection between the electrode tab T and the electrode lead 2 by using the ejecting pressure of the fire extinguishing agent, not only the flow of short-circuit current may be completely intercepted but also the fire extinguishing agent may be ejected more rapidly as the temperature rises due to the advantageous disposed location.

In other words, the bonding portion of the electrode tab T and electrode lead 2 is one of places where the highest amount of heat is generated in the battery cell. Here, the fire extinguishing unit 5 is disposed in the region with large heat generating so that fire may be rapidly prevented or extinguished in response to the temperature rise.

The accommodation container of the fire extinguishing unit 5 may have a smaller thickness in a region corresponding to the bonding portion of the electrode tab T and electrode lead 2, compared to the other region. If the accommodation container of the fire extinguishing unit 5 partially has a small thickness as described above, the thinner portion of the battery cell is broken first due to the temperature rise inside the battery cell, and thus the fire extinguishing agent may be intensively ejected through the corresponding portion to rapidly cut off the coupling between the electrode tab T and the electrode lead 2.

Moreover, the fire extinguishing unit 5 may also be attached to the bonding portion of the electrode tab T and the electrode lead 2 by a thermally conductive adhesive in order to improve thermal conductivity. The thermally conductive adhesive used herein may employ a common thermally conductive adhesive used in the art, and an epoxy adhesive may be used as an example.

Meanwhile, the fire extinguishing unit 5 may be attached to only one surface of the electrode lead 2 as shown in FIGS. 2 and 3, and may also be attached to both surfaces thereof as shown in FIG. 4.

In other words, if the electrode tabs T are classified into two groups as described above so that some electrode tabs T1 are attached to the upper surface of the electrode lead 2 and the other the electrode tabs T2 are attached to the lower surface of the electrode lead 3, in order to completely cut the connection between the electrode tab T and the electrode lead 2 by using the fire extinguishing unit 5, it may be advantageous that the fire extinguishing unit 5 is attached to both the upper and lower surfaces of the electrode lead 2.

Figure 5:
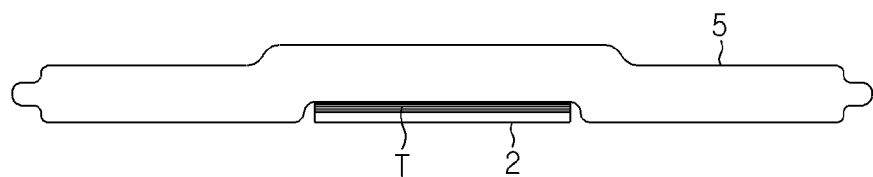
FIG. 5 is a diagram showing an inner structure of a battery cell according to another embodiment of the present disclosure, in which an electrode tab, an electrode lead and a fire extinguishing unit are combined.

Next, a battery cell according to another embodiment of the present disclosure will be described with reference to FIG. 5. FIG. 5 is a diagram showing an inner structure of a battery cell according to another embodiment of the present disclosure, in which an electrode tab, an electrode lead and a fire extinguishing unit are combined.

The battery cell according to another embodiment of the present disclosure is different from the battery cell of in the former embodiment just in that the fire extinguishing unit 5 has a partially bent shape, but other components are substantially identical. Thus, in describing this embodiment, only different features will be described in detail, and a description overlapping with the former embodiment will be omitted.

Referring to FIG. 5, the fire extinguishing unit 5 applied to the present disclosure is attached to the bonding portion where the electrode tab T and the electrode lead 2 are bonded, and has a bent shape along the surface of the electrode tab T and the electrode lead 2. In this embodiment, a thermal conductivity adhesive may also be used to attach the fire extinguishing unit 5.

If the fire extinguishing unit 5 is bent along the surface of the electrode tab T and the electrode lead 2 as described above, the bonding area is widened, and thus the fire extinguishing unit 5 may be more firmly adhered.

In this case, the accommodation container of the fire extinguishing unit 5 may also have a smaller thickness in a region corresponding to the bonding portion of the electrode tab T and electrode lead 2, compared to the other region, similar to the former embodiment. If the accommodation container of the fire extinguishing unit 5 partially has a small thickness as described above, the thinner portion of the battery cell is broken first due to the temperature rise inside the battery cell, and the fire extinguishing agent may be intensively ejected through the corresponding portion to rapidly cut off the coupling of the electrode tab T and the electrode lead 2.

Figure 6:
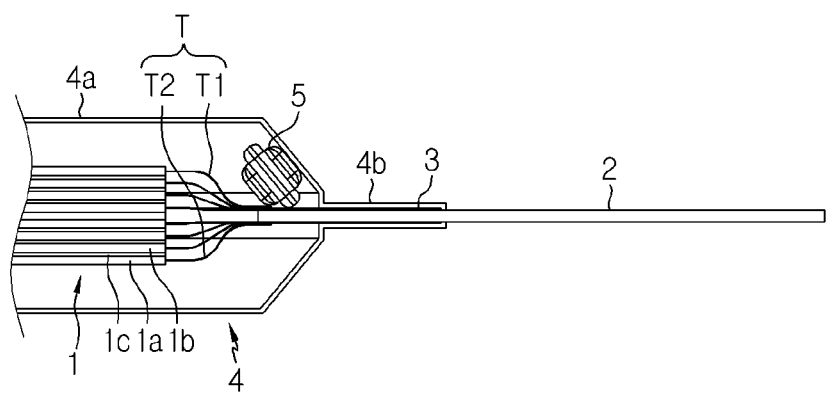
FIGS. 6 and 7 are cross-sectioned views showing an inner structure of a battery cell according to still another embodiment of the present disclosure.
Figure 7:
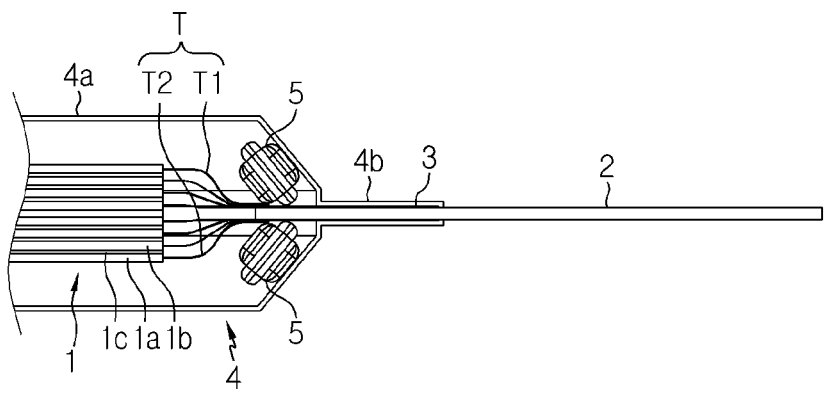

Next, a battery cell according to still another embodiment of the present disclosure will be described with reference to FIGS. 6 and 7. FIGS. 6 and 7 are cross-sectioned views showing an inner structure of a battery cell according to still another embodiment of the present disclosure.

The battery cell according to still another embodiment of the present disclosure is different from the battery cell of in the former embodiment just in relation to a location at which the fire extinguishing unit 5 is attached, but other components are substantially identical. Thus, in describing this embodiment, only different features will be described in detail, and a description overlapping with the former embodiment will be omitted.

First, referring to FIG. 6, in the battery cell according to still another embodiment of the present disclosure, the fire extinguishing unit 5 is disposed in a region corresponding to the bonding portion of the electrode tab T and the electrode lead 2 and is attached to the inner surface of the pouch case 4.

Since the accommodation container is made of a resin as described above, the fire extinguishing unit 5 may be advantageously attached to the inner surface of the pouch case 4, rather than attached to the electrode lead 2 or the electrode tab T, in terms of adhesive force.

In other words, since the inner surface of the pouch case 4 is made of a resin layer having a thermal fusing property as described above, it is more advantageous to attach the accommodation container of the resin extinguishing unit 5, made of resin, to the inner surface of the pouch case 4, rather than attaching to the electrode lead 2 or the electrode tab T, made of metal, in terms of the adhering force.

Meanwhile, even when the fire extinguishing unit 5 is attached to the inner surface of the pouch case 4, the fire extinguishing unit 5 may be provided to both the upper surface and the lower surface of the electrode lead 2. In this case, even though the electrode tabs T are attached to the upper and lower surfaces of the electrode lead 2, it is possible to completely cut off the connection between the electrode leads 2 and the electrode tabs T.

In this case, similar to the former embodiments, the accommodation container of the fire extinguishing unit 5 may have a smaller thickness in a region facing the bonding portion of the electrode tab T and the electrode lead 2, compared to the other region. If the accommodation container of the fire extinguishing unit 5 partially has a small thickness as described above, the thinner portion of the battery cell is broken first due to the temperature rise inside the battery cell, and the fire extinguishing agent may be intensively ejected through the corresponding portion to rapidly cut off the coupling of the electrode tab T and the electrode lead 2.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery cell, comprising:

an electrode assembly;

an electrode lead connected to the electrode assembly;

a pouch case surrounding the electrode assembly and sealed in a state in which the electrode lead extends through the pouch case and is exposed at an outside surface of the pouch case; and a fire extinguishing unit disposed in the pouch case and configured to eject a fire extinguishing agent when a temperature of the fire extinguishing unit is equal to or greater than a predetermined limit temperature, wherein the electrode lead is bonded to an electrode tab connected to the electrode assembly and the electrode lead, wherein the fire extinguishing unit extends along a width direction of the battery cell, and wherein the fire extinguishing unit is attached to a bonding portion at which the electrode tab and the electrode lead are bonded to one another, and the fire extinguishing unit has a shape that is bent around surfaces of the electrode tab and the electrode lead at the bonding portion.

2. The battery cell according to claim 1, wherein the fire extinguishing unit includes:

the fire extinguishing agent; and an accommodation container surrounding the fire extinguishing agent and made of a synthetic resin that is configured to be melted when the temperature of the fire extinguishing unit is equal to or greater than the predetermined limit temperature to open the accommodation container.

3. The battery cell according to claim 1, wherein the fire extinguishing unit is attached to the bonding portion by a thermally conductive adhesive.

4. The battery cell according to claim 1, wherein the fire extinguishing unit is attached to an inner surface of the pouch case.

* * * * *